June 23, 1970     J. S. SENEY     3,516,285
PERFORMANCE ANALYZER AND COMPARATOR FOR A PNEUMATIC JET
Filed July 24, 1967
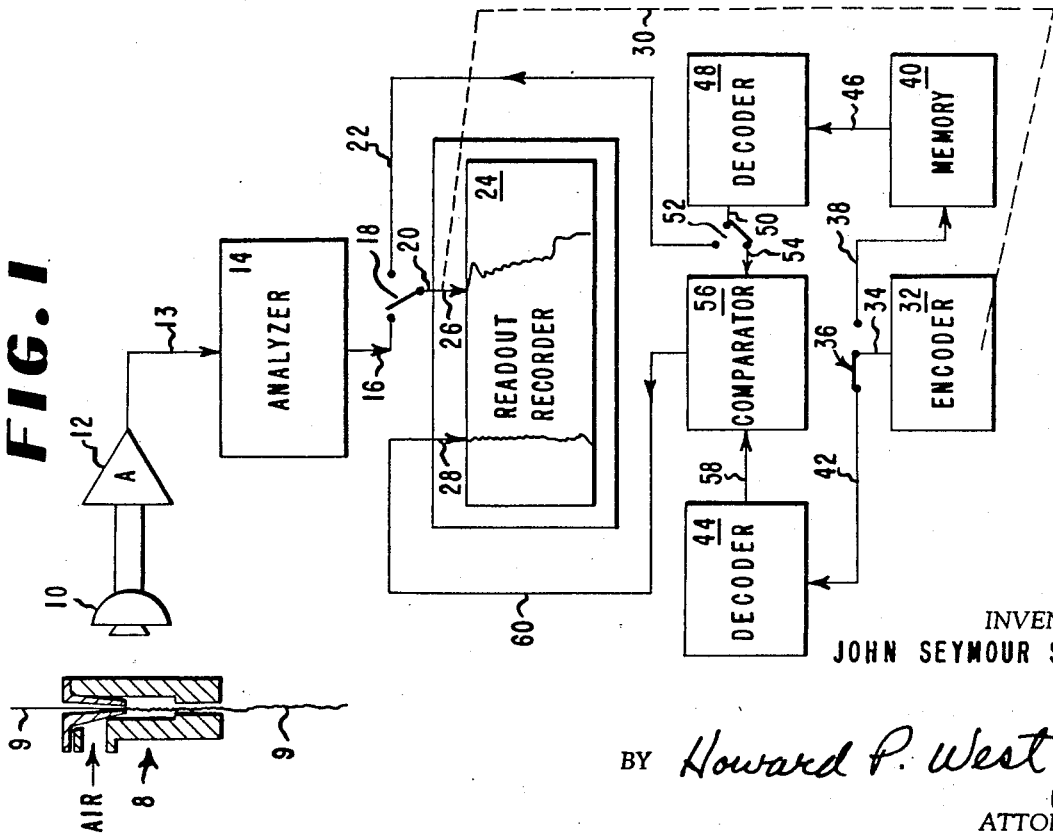
INVENTOR
JOHN SEYMOUR SENEY
BY *Howard P. West Jr.*
ATTORNEY United States Patent Office 3,516,285
Patented June 23, 1970

3,516,285
PERFORMANCE ANALYZER AND COMPARATOR FOR A PNEUMATIC JET
John Seymour Seney, Seaford, Del., assignor to E. I. du Pont de Nemours and Company, Wilmington, Del., a corporation of Delaware
Filed July 24, 1967, Ser. No. 661,735
Int. Cl. G01n 29/00
U.S. Cl. 73—69                                    5 Claims

ABSTRACT OF THE DISCLOSURE

An apparatus for the automatic comparison of sonic characterization spectrums wherein is provided a device for synchronizing the output spectrum of a sonic analyzer with a similarly recorded spectrum.

BACKGROUND OF THE INVENTION

This invention is concerned primarily with analysis of variations in a complex spectrum of sonic vibrations defining a process, a condition, or a situation. More specifically, the invention is concerned with the analysis, recording, and comparison at differing times of the spectra of sonic vibrations characterizing the operation characteristics of a pneumatic jet employed in processing textile yarn.

In operation of a textile process of the type indicated above the jets through which the yarn passes for treatment are subject to constant abrading by the yarn. This abrading causes the internal parts of the jet to wear which results in a gradual change in operating characteristics of the jet. In addition, finish and/or lubricants on the yarn tend to build up in the jet passages also affecting operating characteristics of the jet. When these characteristics deviate from optimum limits the quality of the yarn produced drops off accordingly. However, this drop off in yarn quality is not detected until the yarn is inspected and tested. Frequently, considerable time elapses between the initiation of poor quality yarn, due to changes in jet characteristics and its detection. During this period, poor quality yarn is produced. Furthermore, in a multi-step processing system, it is difficult to pinpoint the problem as being definitely attributable to the jet. Therefore, it is highly desirable to quickly and accurately determine the operating characteristics of a yarn treating jet while it is operating and compare it to a standard to determine when a jet should be changed to prevent producing poor quality yarn.

While it is known to detect abnormal process conditions, such as in a gas liquid-flow process by the analysis of the sounds generated in the process the prior art does not suggest a route for automatically comparing the sonic spectrum characterizing the operating characteristics of a jet with a comparable spectrum taken and analyzed at different time, for example when the jet was new, and performing at optimum levels.

SUMMARY OF THE INVENTION

Two primary objects of this invention are first the analysis and recording of a situation-characterizing spectrum of parameters and, second, the automatic synchronized comparison between this original spectrum and a comparable spectrum taken and analyzed at a different time. A third object is to perform these analyses and comparisons at low equipment costs.

These objects are accomplished by this invention which comprises the combination of an input transducer device connected to a data analyzer which separates the input into a spectrum of recordable signals; an encoder device to transpose the signals to a form which is impressed on a memory device; a decoder device arranged to take the analysis transcribed from the memory device, transpose it and impress it on a comparator device which computes the difference between two similar spectra of signals and feeds the resultant to a readout device with two sections, one section arranged to furnish a readout of the spectrum of signals and a second section to furnish readout of the difference signals from the comparator; a second decoder device; and switching means for directing signals among various components depending on whether a new spectrum of signals is being encoded and placed in the memory device or a comparison of an old analysis with a new analysis is being made; the analyzer, the readout, and the memory being synchronized.

BRIEF DESCRIPTION OF THE DRAWINGS

FIG. 1 is a block diagram of the several components employed in analyses and comparisons of sonic spectra of pneumatic jets such as those used for interlacing yarn;

FIG. 2 is a schematic circuit diagram showing details of means to sychronize the analyzer and the tape recorder.

Turning now to FIG. 1, the illustrative embodiment is described in the form of a performance analyzer and comparator for a pneumatic jet 8 which is used to process a yarn 9. A microphone 10 and preamplifier 12 (models 4135 and 2801 from Bruel and Kjaer of Denmark respectively) are connected over cable 13 to the analyzer 14 (Singer Manufacturing Co. Model SB-15a "Panoramic Ultrasonic Spectrum Analyzer") provided with a motor driven variable filter. The output of analyzer 14 is connected over cable 16 to switch 18. A cable 20 may be connected by switch 18 either to analyzer 14 or to a cable 22. Cable 20 connects to one input side of readout recorder 24. Recorder 24 is a strip chart recorder having two recording heads 26 and 28 and having chart motion which may be synchronized with the drive of the variable filter in analyzer 14. (Two adjacent Heath Co. Model EUW-20A recorders were used.) By mechanical linkage of conventional design indicated by dotted line 30, the motion of recording head 26 is transmitted to the input shaft of the tuning capacitor of a variable frequency oscillator comprising encoder 32 (Heath Co. audio generator model AG-8. It was necessary to bias the linkage to correct for non-linearity in the oscillator tuning capacitor.

Output of encoder 32 is connected over cable 34 to a second switch 36 which has connections either to cable 38 extending to tape recorder memory 40 or to cable 42 extending to decoder device 44. The output of tape recorder memory 40 is carried over cable 46 to another decoder device 48, the output of which is connected over cable 50 to a third switch 52. The terminals of switch 52 are arranged to connect cable 50 either to cable 54 which extends to a comparator device 56 or to cable 22 previously mentioned. The first decoder device 44 is connected over cable 58 to comparator 56. The output of comparator 56 is connected over cable 60 to the second recorder head 28 of readout device 24.

Interlocking circuitry (FIG. 2) is provided to synchronize the tape recorder memory device 40 with the variable filter drive of the analyzer 14. A latching relay 70, having latching coil 72 and trip coil 74, has its armature 76 linked to contacts 78, 78' which furnish forward or reverse power connections to the synchronous reversing scan drive motor 84 of the variable filter device 83 in analyzer 14. Limit switches 80, 82 are provided adjacent the filter drive shaft. When latching relay 70 is in its normal, unlatched position, power is connected through upper contacts 78' and limit switch 82 to the scan drive motor 84. These connections are arranged to drive motor 84 in the clockwise direction until limit switch 82 is opened. An arm 81 is fixed to a rotating part of the variable filter device 83 and extends to a position where it may contact either switch 80 or switch 82 in its two extremes of movement. When switch 82 is contacted by arm 81 clockwise motion is stopped.

Two spaced contacts 90 over which the tape of the tape recorder passes and a short length of conducting tape 88 fastened to the main tape of sufficient length to bridge contacts 90 provide a synchronizing start switch for motor 84 during passage of the tape across these contacts. This energizes relay coil 72 connected to DC source 73, closes contacts 78 and starts motor 84 in counterclockwise motion. When arm 81 touches switch 80, trip latch coil 74 is energized through DC source such as bridge rectifier 73 tripping relay 70, closing contact 78' and reversing motor 84 to reset filter. A push button 86 is provided as shown near the tape recorder so that motor 84 may be operated to check the filter before starting the tape recorder.

In operation, the microphone 10 is placed near a pneumatic jet 8 to be characterized and the signal received by the microphone is amplified and fed to the analyzer 14 which in turn creates a sonic spectral diagram on the chart of recorder 24. The displacement of the chart is a function of the frequency of the sonic vibrations and the displacement of the recording head 26 (FIG. 1) is proportional to the amplitude or intensity of the vibration at each frequency indicated. As the recording head 26 moves in proportion to the amplitude of the received sonic vibration, this motion is mechanically translated to the encoder 32 which operates the tuning condenser of an oscillator the output of which is fed to the tape recorder memory 40. Memory 40 receives and stores the signal at the same time that the recorder 24 makes the initial trace of the analysis which characterizes the jet performance at that time. Now if the tape of the tape recorder is rewound and the recorder signal transcribed over cable 46 (FIG. 1) through decoder 48 and if the switch 52 is connected so that the output of decoder 48 is transmitted over cable 22 and switch 18 is connected to introduce the signal from cable 22 to cable 20 and to head 26, a second trace, this originating in the memory, will be made on the readout recorder 24.

When, at a later time, it is desired to compare the performance of the jet with the performance originally characterizing that jet, the device of this invention operates as follows. Now switch 18 (FIG. 1) is turned to connect cable 16 with cable 20, switch 52 is turned to connect cable 50 with cable 54 and switch 36 is turned to connect cable 34 with cable 42. The tape in the memory is rewound so that it is in the ready position for starting to playback the pre-recorded characteristic for the particular jet which is now to be recharacterized and compared. The short length of conductive tape 88 (FIG. 2) is then spaced from contacts 90 in a direction such that starting the tape will bridge contacts 90. With the microphone of pickup 10 placed near the jet to be recharacterized, the tape is started in motion. Contacts 90 are bridged and drive motor 84 is started thus operating analyzer 14 (FIG. 1) in synchronism with transcription of the tape. The recording head 26 now makes a trace of the present characteristic spectrum for the jet. At the same time encoder 32 receives this analysis over linkage 30 and encodes it. Then the encoded analysis is transmitted over cable 42 to the decoder 44 which in turn transmits the decoded analysis over 58 to comparator 56. At the same time, the original analysis which had been recorded in the tape recorder memory 40 is transcribed over cable 46 to the first decoder circuit 48 and the decoded original analysis is then transmitted over cables 50 and 54 to the comparator where it is combined with the signal from decoder 44 to give an error or difference signal which is passed over cable 60 to the second recording head 28. Thus a difference signal comparing the original characteristic spectrum with the present characteristic spectrum of the jet under analysis is also recorded. A qualitative picture of the change in the sonic spectrum characteristic of the jet can be seen from a comparison of the original readout by recording head 26 with the later recording of the same recording head. At the same time, a quantitative picture of changes in the jet characteristic is made available in the readout of recording head 28.

Many applications and modifications of this invention are possible. For example two jets could be compared by first recording in the memory the characteristic spectrum of a first jet and then comparing this recorded characteristic with that for a second jet as it is received by the input device. Various types of memory devices other than a tape recorder might be applied in this invention such as for example, an area of recording tape attached to a sortable punched card to make the characteristic spectra recorded for a large number of different jets easily available for use in checking performance periodically. Furthermore, it is conceivable that an electrically actuated encoder in place of encoder 32 (FIG. 1) might be applied to encoder the electric signals directly from analyzer 14. Line 30 then would become an electric cable and a switch would be provided just before cable 30 reached encoder 32 so that cable 30 could be connected either to the encoder or directly to the comparator 56 depending on whether it was desired to record in the memory 40 or to make comparison by way of comparator 56. Other modifications and applications of this invention such as electrocardiogram analyses, will be apparent to one skilled in the art.

I claim:

1. In an apparatus for comparing the spectrum of sonic vibrations characterizing a jet with a tape recording of a similar spectrum of sonic vibrations, including a transducer acoustically coupled to the jet, a sonic spectrum analyzer electrically connected to the transducer and provided with a variable filter driven by a motor for sequentially segregating the sonic vibrations from the jet into an output signal spectrum, and means for combining the output signal spectrum of the analyzer with the recorded spectrum to provide a difference signal spectrum, a device for synchronizing the output of the analyzer with the output of the tape recording, said device comprising:
   (a) a tape having an electrically conductive portion adjacent one end of the recorded spectrum;
   (b) spaced electrical contacts engaging said tape, said conductive portion being capable of bridging said contacts;
   (c) means for driving said tape past said contacts;
   (d) a source of power; and
   (e) means connected between said contacts, said power source and the filter drive motor for energizing the motor for predetermined directional rotation of said filter when said conductive portion bridges said contacts, thereby synchronizing said rotation with the recorded spectrum on the tape.

2. The apparatus of claim 1 wherein said filter drive motor is a synchronous reversing motor.

3. The apparatus of claim 1 wherein said means for energizing the motor is a latching relay.

4. The apparatus of claim 3 wherein is provided a means connected between said power source and said latching relay for reversing said predetermined directional rotation.

5. In an apparatus for comparing the spectrum of sonic vibrations characterizing a jet with a recording of a similar spectrum of sonic vibrations, including a transducer acoustically coupled to the jet, a sonic spectrum analyzer electrically connected to the transducer and provided with a variable filter driven by a motor for sequentially segregating the sonic vibrations from the jet into an output signal spectrum, and means for combining the output signal spectrum of the analyzer with the recorded spectrum to provide a difference signal spectrum, a device for synchronizing the output of the analyzer with the output of the recording, said device comprising:
   (a) a memory device containing the recorded spectrum and having a synchronizing element adjacent one end of the recorded spectrum;
(b) a detector positioned adjacent said memory device for detecting passage of said element;
(c) means for driving said memory device past said detector;
(d) a source of power; and
(e) means connected between said detector, said power source and the filter drive motor for energizing the motor for predetermined directional rotation of said filter when said element passes said detector, thereby synchronizing said rotation with the recorded spectrum from the memory device.

References Cited

UNITED STATES PATENTS

| 2,971,896 | 2/1961 | Curl | 202—160 |
| 3,015,949 | 1/1962 | Arnold | 73—71.5 |
| 3,095,532 | 6/1963 | Floyd | 73—71.4 XR |
| 3,315,522 | 4/1967 | Frarey et al. | 73—71.4 |

JERRY W. MYRACLE, Primary Examiner

U.S. Cl. X.R.

73—1.4